US008943169B2

(12) United States Patent
Wong et al.

(10) Patent No.: US 8,943,169 B2
(45) Date of Patent: Jan. 27, 2015

(54) DEVICE AFFILIATION PROCESS FROM SECOND DISPLAY

(75) Inventors: Ling Jun Wong, Escondido, CA (US); Davender Agnihotri, Murrieta, CA (US); True Xiong, San Diego, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 459 days.

(21) Appl. No.: 13/076,783

(22) Filed: Mar. 31, 2011

(65) Prior Publication Data

US 2012/0206317 A1 Aug. 16, 2012

Related U.S. Application Data

(60) Provisional application No. 61/441,965, filed on Feb. 11, 2011.

(51) Int. Cl.
*G06F 15/16* (2006.01)
*H04N 7/173* (2011.01)
*G06F 21/10* (2013.01)

(52) U.S. Cl.
CPC ..................................... *G06F 21/10* (2013.01)
USPC .......................................... 709/219; 725/109

(58) Field of Classification Search
USPC ........................................ 386/230; 709/219
See application file for complete search history.

(56) References Cited

U.S. PATENT DOCUMENTS

| 6,061,740 | A | 5/2000 | Ferguson et al. |
| 6,356,543 | B2 | 3/2002 | Hall et al. |
| 7,612,685 | B2 | 11/2009 | Harris et al. |
| 2005/0120096 | A1 | 6/2005 | Rekimoto et al. |
| 2005/0130744 | A1* | 6/2005 | Eck et al. ......................... 463/43 |
| 2010/0022233 | A1 | 1/2010 | Jung et al. |
| 2011/0280398 | A1* | 11/2011 | Fradis ........................... 380/201 |
| 2012/0082427 | A1* | 4/2012 | Andres Del Valle et al. . 386/230 |
| 2012/0166596 | A1* | 6/2012 | Espelien ....................... 709/219 |

FOREIGN PATENT DOCUMENTS

| CN | 101223489 | 7/2008 |
| CN | 101690218 . | 2/2014 |
| EP | 2128760 A1 | 12/2009 |

* cited by examiner

*Primary Examiner* — Emmanuel L Moise
*Assistant Examiner* — Mahran Abu Roumi
(74) *Attorney, Agent, or Firm* — Mark D. Wieczorek; Mayer & Williams PC

(57) ABSTRACT

Apparatus and methods for using a second display with a network-enabled television. In one implementation, this feature allows the user to conveniently affiliate their IPTV devices with various service providers and manage such affiliations directly from a second display device instead of going to a separate affiliation website. The second display could be a smart phone that can often be found beside the user, a laptop or tablet PC, a desktop PC, or the like.

34 Claims, 10 Drawing Sheets

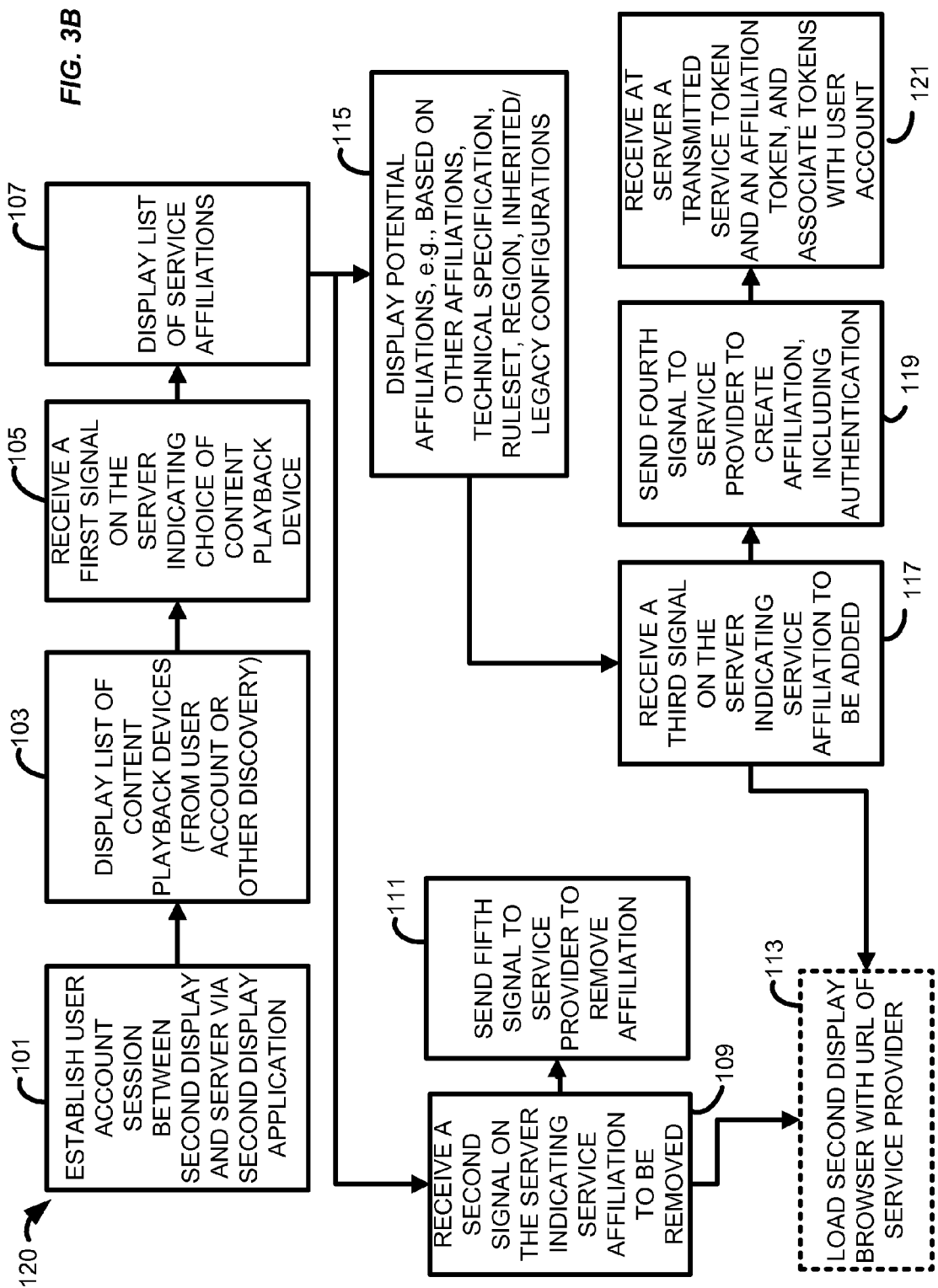

DEVICE AFFILIATION PROCESS FROM SECOND DISPLAY

CROSS-REFERENCE TO RELATED APPLICATIONS

This application claims benefit of priority to U.S. Provisional Patent Application Ser. No. 61/441,965, filed Feb. 11, 2011, entitled "Device Administrative Management from a Second Display", owned by the assignee of the present application and incorporated by reference herein.

BACKGROUND

Internet delivery of digital content to IPTVs continues to increase, as does the popularity of IPTVs themselves. Digital content delivery is often performed from content service providers, but some degree of affiliation between a user's content playback device and the service provider is generally required to allow content access, e.g., for DRM purposes. This requirement currently forces the user to log onto a separate system, e.g., using their computer, to make the affiliation. Managing other administrative configurations also requires such interactions because typical registration portals are not engineered to work on mobile devices due to, e.g., their complexity.

SUMMARY

Systems and methods are provided that allow a user to manage their device administrative configurations directly from a second display application, such as a web application. Such systems and methods address the needs described above, and further address the difficulty of implementing a mobile version of a service registration site. Such administrative configurations include unregistering, setting up new affiliations, and destroying existing ones.

In the case of affiliations, various benefits may inure. When a user affiliates a device with a service, the service may then use the affiliation information when that device contacts the service. In this way, service providers are assured that a known device is making contact and can modify their responses based on previous behavior by that user, such as setting a preference or marking an asset as a favorite. If the user entered authentication for an account with the service provider as part of the affiliation process, then the service provide can tell which of their user accounts is associated with the affiliation presented by the device, in turn allowing the service provider to determine what content that user is authorized to view. For example, a user may have purchased a movie from a service provider. Through an affiliation that was set up with authentication, the service provider can determine that the account used to purchase the movie is that which is contacting the service provider, and thus that the device is authorized to watch the movie.

Optionally, a user account, instead of a specific device, can be affiliated with a service provider. In that case, any device registered to the user account may provide the affiliation credentials to the service provider, identifying that device as being registered to the user account with that affiliation. In this regard, where the system and method display a list of service affiliations, the same may be displayed regardless of which device is chosen, or even if no devices are chosen. The devices displayed and controlled may then include any associated with the user account, or any that have been discovered by the second display, e.g., on the local network but not registered with the user account. Of course, besides cases where an affiliation is with a user account and not a device in particular, a user may wish to view all service affiliations without regard to device, and the same type of listing may again be displayed.

In one exemplary implementation, in which a web application is employed, the following steps are performed. The user begins by logging onto a second display web application and selecting a device. Under a "manage device" section, the user is able to view their service affiliations for the device and is given a choice to unregister. Selecting to unregister an existing affiliation may send an instruction to the registration portal to destroy the affiliation. Selecting a button to unregister the device may send an instruction to the registration portal to unregister the device and reset the device's registration settings. In this case, the second display may automatically return to the device list for selection of another device, if any are available. If the device list is empty, an empty list may be displayed. To create a new affiliation with a service, the user can be redirected directly to the service's affiliation webpage for affiliation, avoiding the need for a user to have to type in and navigate to the service's special affiliation URL. Alternatively, the user may indicate that the affiliation is to be made, and the system may provide the necessary information and, e.g., authentication credential, of the content playback device, to the service provider to create the affiliation.

In this way, the user can manage their device administrative configurations from a second display. In addition, the user does not have to remember the URL of the registration portal, which may be difficult to remember or find when needed. In this way, the second display is the single and central source of control for both the IPTV control and its corresponding administrative configurations.

Implementations of the invention may include one or more of the following. The system and method may allow a degree of device configuration and management that has not been achieved before. For example, region-specific business logic may be automatically implemented in content delivery. In this way, a user may have an IPTV in the United States and another, on the same account, in China. A user browsing content offerings, e.g., on a second display, may have chosen a particular device as a playback device. If the device in China is chosen, the second display will show content offerings according to what is allowed in China, according to either government or contract rules or otherwise. The same is true in the United States, where the content offerings will correspond to what is allowed in the US, by the same sorts of rules. In some cases, the user will exercise a degree of control, such as via opt-in or opt-out functionality.

The system may then be extended to other situations, with a significant degree of flexibility. For example, a user may browse and select content on a second display, but direct the content to only be played back on a particular content playback device at a given time or within a range of allowed times. Such a choice of content may be prohibited from other content playback devices, such as those in a family or living room, because of family- or group-selected viewer restrictions.

The second displays provide complementary functionality to the IPTV, but generally do not require additional investment by the user because the same make use of a device, e.g., a smartphone, laptop computer, tablet computer, a desktop, an internet appliance, etc., which most users would already have in their possession. Such a second display is a perfect complement to an IPTV because of the second display's strength in supported languages and character font sets, data entry, processing power, and user experience in content management. The application running on the second display may be a web application (scripting or non-scripting), a native application, a Java application, or any other sort of application that may communicate with a server. For example, the ASP/.NET framework with RPC can be employed to write the second display application. Where the web application running on the second display is written in HTML or HTML with JavaScript, the same may be loaded by any device with a browser, and so the same is not limited to only a small set of compatible devices or expensive remote controls. Where a smart phone is employed, a mobile version of the registration portal may be employed, with an appropriate listing of fields and an appropriate mobile resolution.

Communications with service providers may take place through a proxy server, and the proxy server presents to service providers the authentication credentials of the content playback device, so that the second displays appear to the service providers as an authenticated content playback device.

The second displays may include any device that can run an application that communicates with a content playback device, including, but not limited to, personal computers, laptop computers, notebook computers, netbook computers, handheld computers, personal digital assistants, mobile phones, smart phones, tablet computers, hand-held gaming devices, gaming consoles, and also on devices specifically designed for these purposes, in which case the special device would include at least a processor and sufficient resources and networking capability to run the web application.

The content playback device can take many forms, and multiple content playback devices can be coupled to and selected within a given local network. Exemplary content playback devices may include IPTVs, DTVs, digital audio systems, or more traditional video and audio systems that have been appropriately configured for connectivity. In video systems, the content playback device includes a processor controlling a video display to render content thereon.

In a general method, a user employing a second display has a user account with a source or clearinghouse of services. Here, the source or clearinghouse is represented as a user account on a management server, but it should be understood that the user account may be with a service provider directly. In any event, this account has information stored thereon related to what content playback devices are associated with the account. When a user logs on, they may see this list of content playback devices and may choose a particular content playback device. If there is only one content playback device on the network, or if the user is browsing in a way that the content playback device identity is not needed, then this step may be omitted.

Once a content playback device has been chosen, a list of services may be displayed (if more than one is available). The list of services may be customized to those that have content playable on the chosen content playback device, or all available content may be displayed, in which case, in certain implementations, a notation may be displayed adjacent the content item as to whether it is playable on the selected device. Where no content playback device has been selected, all available content may be displayed. If no content playback device has been selected, but the user account includes stored information about which content playback devices are available, then all content may be displayed, a subset of all content may be displayed based on the known content playback devices associated with the account, or notations may be presented about which content playback devices can play which content, or a combination of these. In some cases, a content service provider may require a content playback device to be chosen. In other cases, no content playback device need be chosen and the user may simply choose and queue content for later playback by a content playback device to-be-determined at a later time.

Assuming multiple services are available, the user then selects a service to browse. In many cases, access to a service requires becoming affiliated with the service. Affiliation in turn requires certain user account information as well as, in some cases, the authentication credentials of the content playback device. As described in greater detail above, the registration of the content playback device may include a step of affiliating the content playback device with one or more services, so that the service affiliation need not entail a separate user step following device registration. In particular, the user account may include information about which services the user has affiliations with, and once a new content playback device is added, the affiliations may be automatically matched to the content playback device, so long as other requirements are met. For example, some services only allow a limited number of devices, or only allow particular types of devices. Besides automatic matching, the user may be prompted to select which affiliations to create.

Once the content playback device is affiliated with the services, the user may choose which service they wish to browse. For cases where a content playback device has not been chosen, the user may still choose services and browse, but the content offerings may be less specific to a given content playback device. Such situations are discussed in greater detail below. In any event, the service presents a list of available content items as noted above. The presentation may be in any number of forms, including by category, or in any other form of organization. The proxy server presents an authentication credential of the content playback device to the content server. In some cases, service provider credentials for accessing the various services may be stored in the account, and presented by the proxy server or management server to the content server when needed.

Individual services may employ their own DRM schemes which the current system may then incorporate. For example, if a video content service provider only allows a certain predetermined number of devices on which their content may be played back, then this rule will be enforced or duplicated within the current system and method. Moreover, changes to such service provider parameters may be periodically polled for by the proxy server and/or management server, or the same may be polled for at the next login of the service, e.g., at the time the affiliation is renewed. In other words, upon login, the system and method may poll for and receive a token associated with the given service provider, the token providing information to the system about the user account with the content service provider.

The system and method may include a management server which, along with the content playback device, communicates with at least one content server such that the content server provides content items for presentation or access of the content item at the content playback device. The system and method may further include a proxy server communicating with the management server and the second displays. In some cases, the proxy server may be merged with the management server, or in other cases a separate proxy server may be provided for each content server or service provider.

In one aspect, the invention is directed to a method of managing service affiliations of one or more content playback devices using a second display, including: establishing a session between a second display and a server; causing a list of one or more content playback devices to be displayed on the second display; receiving a first signal on the server indicating a user choice of a content playback device; causing a list of service affiliations to be displayed on the second display corresponding to service providers, the service affiliations associated with the content playback device; and either receiving a second signal on the server indicating that a service affiliation associated with the content playback device is to be removed, and removing the service affiliation, or receiving a third signal on the server indicating that a service affiliation is to be added and associated with the content playback device, and sending a fourth signal to a service provider associated with the service affiliation to create the service affiliation. Instead of the service affiliations being associated with the content playback device, in another implementation, the service affiliations may be associated with the user account. In yet another implementation the service affiliations may be associated with both the user account and the content playback device.

Implementations of the invention may include one or more of the following. The session may be associated with a user account, where at least one of the content playback devices displayed are associated with the user account, and where at least one of the service affiliations displayed are associated with the user account. The method may further include displaying a list of potential service affiliations, and where the receiving a third signal on the server further includes receiving a selection from the list of potential service affiliations. The method may further include generating the list of potential service affiliations based on at least one other service affiliation associated with the user account. The method may further include generating the list of potential service affiliations based on at least one technical specification associated with the chosen content playback device. The method may further include generating the list of potential service affiliations based on at least one ruleset, and the ruleset may be based on a geographic region of the chosen content playback device. The method may further include loading a browser of the second display with a URL associated with the chosen service provider. The method may further include receiving information about the content playback device from a second server. The content playback device may be an IPTV, a digital video recorder, a Blu-Ray® player, a Blu-Ray® recorder, a DVD player, a DVD recorder, an internet appliance, or an audio system. The method may further include inheriting a configuration from another content playback device, the configuration including at least one set of one or more service affiliations. The second display may be a tablet computer, a smart phone, a laptop computer, a desktop computer, an internet appliance, or a computing device with internet access. Upon receipt of the third signal, the method may further include receiving an inputted code and transmitting the received code to the service provider, and receiving from a service provider a transmitted user token and affiliation token, the tokens to be associated with the user account. Upon receipt of the second signal, the method may further include that at least one user account identifier and the authentication credential are transmitted to the service provider, whereby the service affiliation is removed from the content playback device. The causing a list of one or more content playback devices to be displayed on the second display may include: retrieving information about content playback devices from a user account, discovering content playback devices on a local network, discovering content playback devices from a wireless broadcast communication, or discovering content playback devices from an infrared remote control signal. The removing the service affiliation may further include sending a fifth signal to a service provider associated with the service affiliation to remove the service affiliation. The fourth signal may include at least one authentication credential associated with the content playback device.

In another aspect, the invention is directed to a non-transitory computer-readable medium, including instructions for causing a computing device to implement the above method.

In yet another aspect, the invention is directed towards a method of displaying service affiliations of one or more content playback devices using a second display, including: establishing a session between a second display and a server; causing a list of one or more content playback devices to be displayed on the second display; receiving a first signal on the server indicating a user choice of a content playback device; and generating a list of service affiliations to be displayed on the second display corresponding to service providers, the service affiliations associated with the content playback device. Instead of the service affiliations being associated with the content playback device, in another implementation, the service affiliations may be associated with the user account. In yet another implementation the service affiliations may be associated with both the user account and the content playback device.

Implementations of the invention may include one or more of the following. The ruleset may be based on a geographic location of the chosen content playback device, or may be based on a time of day of the chosen content playback device. The method may further include filtering the list based on a ruleset, and causing the filtered list to be displayed on the second display.

In another aspect, the invention is directed to a non-transitory computer-readable medium, including instructions for causing a computing device to implement the above method.

In another aspect, the invention is directed towards a method of managing service affiliations of one or more content playback devices using a second display, including: establishing a session between a second display and a server; displaying a list of one or more content playback devices on the second display; transmitting a first signal to the server indicating a user choice of a content playback device; displaying a list of service affiliations corresponding to service providers, the service affiliations associated with the content playback device; and either transmitting a second signal to the server indicating that a service affiliation associated with the content playback device is to be removed, or transmitting a third signal to the server indicating that a service affiliation is to be added and associated with the content playback device, whereby a fourth signal is sent to a service provider associated with the service affiliation to create the service affiliation.

Implementations of the invention may include one or more of the following. The session may be associated with a user account, where the content playback devices are associated with the user account, and where the service affiliations are associated with the user account. The method may further include transmitting a fifth signal to a service provider associated with the service affiliation to remove the service affiliation. The fourth signal may include at least one authentication credential associated with the content playback device.

In another aspect, the invention is directed to a non-transitory computer-readable medium, including instructions for causing a computing device to implement the above method.

In another aspect, the invention is directed towards a method of displaying service affiliations of one or more content playback devices using a second display, including: establishing a session between a second display and a server, the session associated with a user account; and generating a list of service affiliations to be displayed on the second display corresponding to service providers, the service affiliations associated with the user account. In another aspect, the invention is directed to a non-transitory computer-readable medium, including instructions for causing a computing device to implement the above method.

In another aspect, the invention is directed towards a method of managing service affiliations of one or more content playback devices using a second display, including: establishing a session between a second display and a server; displaying a list of one or more content playback devices on the second display; transmitting a first signal to the server indicating a user choice of a content playback device; displaying a list of service affiliations corresponding to service providers, the service affiliations associated with the user account or with the chosen content playback device; and either transmitting a second signal to the server indicating that a service affiliation is to be removed, or transmitting a third signal to the server indicating that a service affiliation is to be added and associated with the user account or content playback device, whereby a fourth signal is sent to a service provider associated with the service affiliation to create the service affiliation.

Advantages of certain embodiments of the invention may include one or more of the following. Content playback devices may be conveniently affiliated or de-affiliated with a service provider and managed using the system and method. Other features may be provided, e.g., a displayed list of service providers may automatically take into account regional or business rulesets.

Other advantages will be apparent from the description that follows, including the figures and claims.

BRIEF DESCRIPTION OF THE DRAWINGS

Like reference numerals denote like elements throughout.

FIG. 3B is a flowchart illustrating another exemplary method according to another aspect of the present principles.

DETAILED DESCRIPTION

Figure 1:
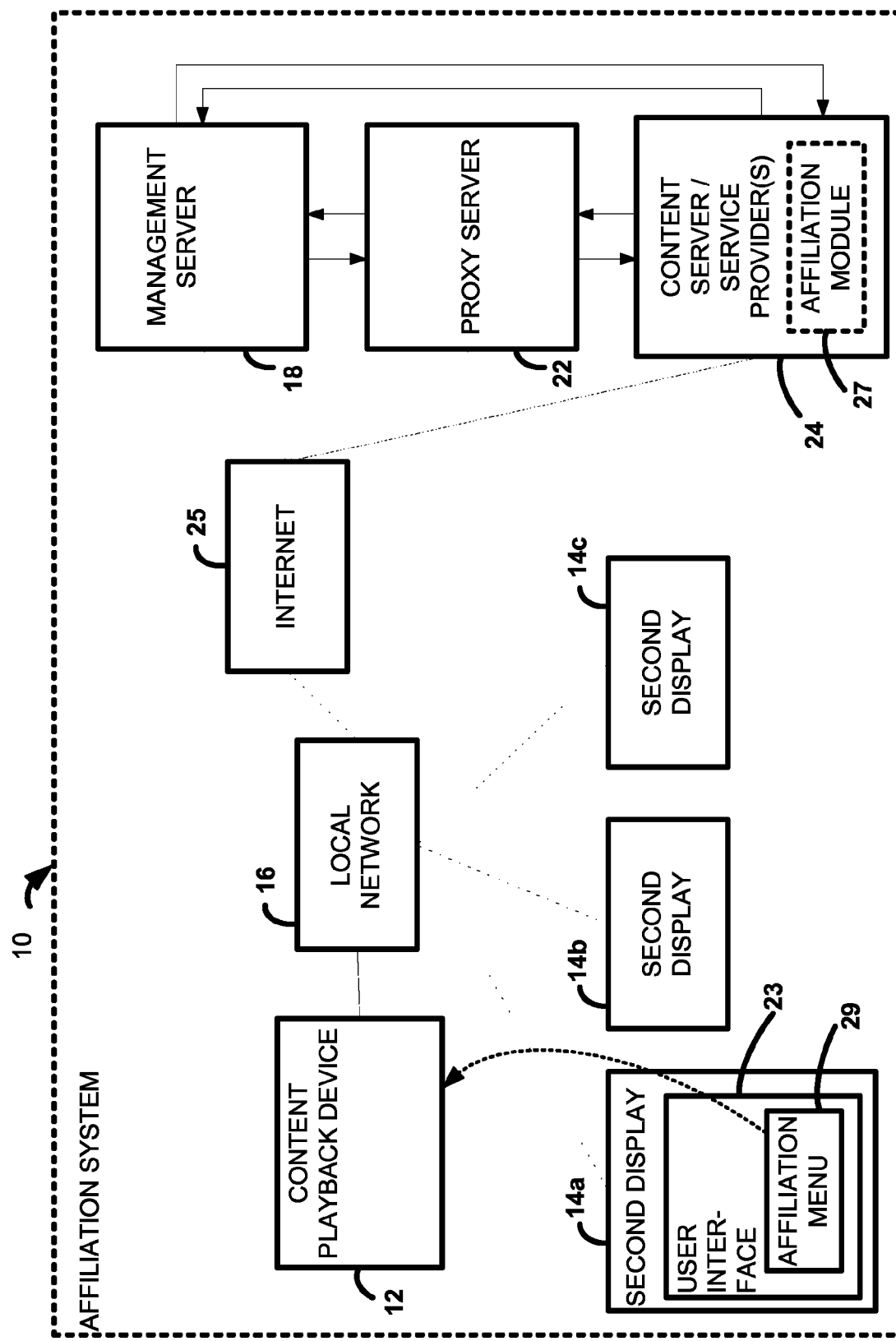
FIG. 1 is a block diagram of an exemplary system in accordance with one aspect of the present principles.

Referring initially to FIG. 1, a system 10 is shown including a content playback device 12 coupled to a local network 16, which may be wired, wireless, or a combination of both. Also coupled to the local network 16 are one or more second displays 14a-14c, an exemplary one of which is termed herein second display 14i. A number of servers may be accessed by the content playback device 12 and the second display 14i through the local network 16 and the internet 25, including a management server 18, a proxy server 22, and one or more content servers 24 corresponding to service providers (only one is shown in FIG. 1).

The second display 14a includes a user interface 23 on which a user may access an affiliation menu 29. Using the affiliation menu 29, the user can affiliate the content playback device 12 and their user account with one or more service providers 24. The affiliation menu 29 may be presented in a number of forms. For example, after a user account has been accessed, a set of service affiliations may be displayed pertaining to the user account. In another implementation, a user chooses a content playback device first, and then a set of service affiliations is displayed, based on the chosen content playback device and on the user account. In any case, once the service affiliations are displayed, various functionality may be provided and displayed such as to remove the service affiliation or change a service affiliation. As described in greater detail below, a set of potential service affiliations may also be displayed, from which a user may choose to create a new service affiliation.

In many cases, an authentication credential of the content playback device will also be logged with the user account and/or with a service provider, this credential is often required for access to services and content items. The use of an authentication credential is discussed below. Content access is granted to the content playback device 12 and second display 14a through an affiliation module 27 associated with the service provider 24.

Using the system 10 of FIG. 1, a convenient and flexible user interface 23 of the second display 14a may be leveraged to provide a superior experience for the user in affiliating the content playback device 12 and their user account with a service provider. The content playback device 12 may be affiliated by the user employing the second display without leaving its vicinity, comfortably and without the inconvenience of doing the same on a separate PC or other computing device. In addition, any required affiliation information may be entered in a much more flexible user interface, including potential use of the user's own language.

Details of individual components are now described.

The content playback device 12 may be, e.g., an IPTV, a digital TV, a digital sound system, a digital entertainment system, a digital video recorder, a video disc player, a combination of these, or any number of other electronic devices addressable by a user on the local network 16. For the sake of simplicity, in this specification, the content playback device 12 will occasionally be exemplified by an IPTV, in which case it will generally include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, or disk-based storage. Software code implementing present logic executable by the content playback device 12 may also be stored on one of the memories shown to undertake present principles. The processor can receive user input signals from various input devices including a remote control device, a point-and-click device such as a mouse, a keypad, etc. A TV tuner may be provided in some implementations, particularly when the content playback device 12 is embodied by an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 16. It will be understood that communications between the content playback device 12 and the internet 25, or between the second display 14i and the internet, may also take place through means besides the local network 16. For example, the second display 14i may communicate with the content playback device 12 through a separate mobile network.

The one or more second displays 14a-14c each bear a processor and components necessary to operate an application for service provider and content selection, variations of which are described above. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on one of the memories shown to undertake present principles. Further, the second display 14i can receive user input signals from various input devices including a point-and-click device such as a mouse, a keypad, a touch screen, a remote control, etc. A network interface such as a wired or wireless modem communicates with the processor to provide connectivity to wide area networks such as the Internet as noted above.

The servers 18, 22, and 24 have respective processors accessing respective non-transitory computer-readable storage media which may be, without limitation, disk-based and/or solid state storage. The servers communicate with a wide area network such as the Internet via respective network interfaces. The proxy server 22 may in some cases be combined with the management server 18, although in many cases it may be preferable to separate the servers to better accommodate server load. The servers may mutually communicate via the internet 25. In some implementations, the servers may be located on the same local network, in which case they may communicate with each other through the local network without accessing the internet. For example, in one exemplary implementation, the management server 18 and the proxy server 22 may be disposed in the same data center, so communication between the two may stay within the data center.

While an exemplary method of the system is described below, certain method steps especially pertinent to certain arrangements of the second display will be described here.

Responsive to the second display 14i sending a request to the proxy server 22 for an executable utility, the proxy server 22 returns the utility to each second display 14i. Running the utility causes the instantiation of an application. The implementation discussed here includes a web application, but it will be understood that other types of applications may also be employed as described above. The second display 14i, executing the web application, prompts a user to input to each second display 14i login information. The login information may be common or may differ between second displays. The proxy server 22, responsive to reception of correct login information from the content playback device 12, returns the local IP address of the content playback device 12 to the second display 14i, because the same has previously been registered to a user account in which such information is maintained. The proxy server 22 may also return a list of content playback devices on the local network, responsive to which the second display 14i may select one for content playback. In turn, each second display 14i uses the local content playback device address to access the content playback device 12 directly to request information about the content playback device 12, which information is returned from the content playback device 12 to the second display 14i such that the local address of the content playback device 12 need not be globally addressable. Each second display 14i may also select content for playback on different content playback devices. The second display 14i sends the information about the content playback device 12 to the proxy server 22, requesting a list of services available to the content playback device 12 from one or more service providers. The services may be dependent on the device characteristics of the content playback device 12 chosen. For example, if the chosen content playback device 12 is an IPTV, video services may be returned. If the chosen content playback device 12 is an audio system, audio services may be returned.

The proxy server 22 relays the request for a list of services to the management server 18, which returns the list to the proxy server 22, with the proxy server 22 in turn sending the list to the second display 14i for presentation of information on the second display 14i. Responsive to a user selection of an item on the list, the second display 14i sends a request for a software asset corresponding to the selected content item to the proxy server 22. The proxy server 22 requests a service login of the content server 24 providing the content, and the content server 24 provides to the proxy server 22 a list of content items, assets, categories, or services, and the proxy server 22 relays the list to the second display 14i, which is presented on the second display 14i so that the user can navigate to enter a selection. Responsive to the selection, the second display 14i sends a command to the content playback device 12 to access and play back the selection.

The command to play the local content item may be in a number of forms. The second display 14i may communicate to the proxy server 22 the request on behalf of the content playback device 12, and this request may be via the local network or via other means. Alternatively, the second display 14i may transmit a request to the content playback device 12 that it itself formulate the request, and this transmission may be by way of the local network, the internet generally, or via other means such as other wired or wireless transmission schemes, including via USB, IR, Bluetooth®, or any other schemes. If the second display 14i is configured to address the content playback device 12 at a non-local level, e.g., at the server level, then the second display 14i may be physically located virtually anywhere and still be able to queue content or to command the content playback device 12 to play content. In this case, however, server load would increase over the case where the second display and content playback device communicated directly or over a local network.

Certain method steps of an arrangement of the content playback device are described here. Using a network interface, the content playback device 12 can communicate with a management server 18 on the Internet and with one or more content servers 24, also on the internet and communicating with the management server 18. The management server 18 receives and stores a local IP address of the content playback device 12. The content playback device 12 communicates with the management server 18 to arrange for content items from the content server 24, operated by a service provider, to be played back on the content playback device 12. In more detail, the content playback device 12 sends login information to the management server 18 which returns to the content playback device 12 a user token that must subsequently be presented by the content playback device 12 to the content server 24 to obtain content from the content server 24.

Figure 2:
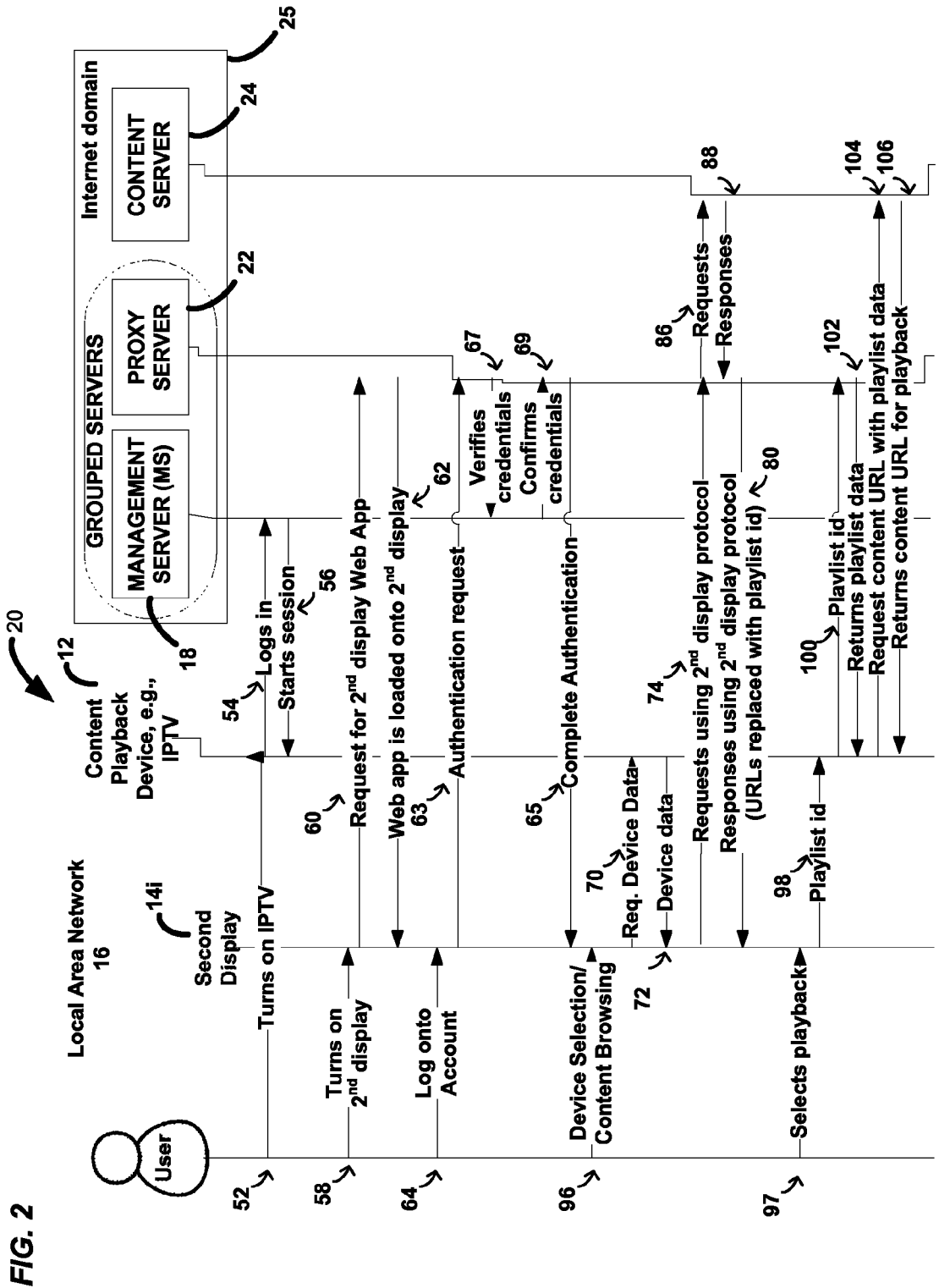
FIG. 2 is a sequence diagram illustrating a system and method according to one aspect of the present principles.

FIG. 2 is a sequence diagram illustrating an exemplary implementation of the system and method for enabling a user to employ a second display to browse content playback devices, service providers, content items and select the same for playback by a content playback device. FIG. 2 assumes that the user has already created an account with a management server and has affiliated one or more content playback devices with that account.

At state 52, a user turns on the content playback device 12. At state 54 the content playback device sends login information including, e.g., username and password, to the management server 18, which at state 56 returns to the content playback device a user token that may subsequently be presented by the content playback device to a content server 24 to obtain content from that server. The management server 18 in addition stores the local IP address of the content playback device 12.

At state 58, the user turns on the second display 14*i* and, e.g., instantiates a web browser session in which control may be exercised over the content playback device. A utility is executed on the second display 14*i*, at state 60, which sends a request to the proxy server 22, which returns in state 62 a web application, e.g., HTML with JavaScript, for the second display to execute for browsing content items. This application may make, e.g., asynchronous JavaScript and XML calls to the proxy server 22 and to the content playback device 12 to obtain information to control the content playback device 12.

With more specificity, at state 64, using the JavaScript received from the proxy server 22, the second display 14*i* prompts the user to input to the second display 14*i* the account login information, including, e.g., the same username and password that the content playback device provided to the management server 18 in state 54 during device registration. Of course, the account login information may differ as well. It will be appreciated that the servers 18, 22, and 24 communicate necessary account information between them as needed to realize the principles described here.

The proxy server 22 responds to a correct user name and password from the second display 14*i* in an authentication request state 63. The proxy server 22 verifies the user name and password with the management server 18 (states 67 and 69), creates and transmits a session token to the second display, obtains information about content playback devices affiliated with the user account, and completes the authentication in state 65. The proxy server 22 may return to each second display the information about all content playback devices 12 that are affiliated with the user account associated with the user name and password, including their local IP addresses which were stored by the management server 18 after login at 54 (and subsequently provided to the proxy server 22). In more detail, the proxy server 22 sends a token to the second display 14*i*, the token associated with a content playback device, and this token gets communicated in future transactions between the second display and the proxy server, so that the proxy server 22 knows what content playback device the content item is intended for. Each user with each second display may then choose a content playback device and browse the services and content options available through the services in state 96 and subsequent steps.

The second display 14*i*, using the local IP address returned as noted above, accesses the content playback device directly, in the sense of communicating through the local network. To select a particular content playback device, the second display 14*i* requests information about the content playback device 12 at state 70, including language information, digital rights management (DRM) information, etc., as desired, which information is returned from the content playback device to the second display 14*i* at state 72. Since the second display 14*i* knows the IP address of the content playback device 12 and consequently communicates directly with the content playback device 12, the second display 14*i* communicates using a local web address of the content playback device 12 that need not be globally addressable, and may so communicate as long as the second display 14*i* and content playback device 12 are on the same local network.

Each second display 14*i* may send the client information received at state 72 to the proxy server 22, requesting a list of services available to the content playback device 12, or that the content playback device 12 is entitled to, from one or more of the content servers 24. The proxy server 22 relays the request to the management server 18, which returns the requested service list to the proxy server 22. The proxy server 22 in turn sends the services list to the second display for presentation of available services on, e.g., a display of the second display. Each user browses the services and their content on the second display just as though it were the actual content playback device.

A user can input, using, e.g., a second display input device, a selection of a service on the list that was returned to the second display. In response, the second display, at state 74, sends a request for the corresponding service to the proxy server 22 along with the service token that that second display may have received from the content server 24 via the management server 18.

Responsive to the request, the proxy server 22 requests a service login at state 86 of the content server 24 providing the selected service. At state 88, the content server 24 provides to the proxy server 22 a list of content items, assets, categories or services, as the case may be, for the particular content server 24. If desired, the proxy server 22 may also request of the content server 24 a list of options, and the list may be returned in, e.g., extended markup language (XML) format to the proxy server 22 which relays the content items, assets, categories, services, etc. available for selection to the second display at the state 80.

The content available for selection is presented on the second display so that the user can navigate in state 97 the display to enter a selection. Responsive to the selection, the second display at state 98 sends a command to the content playback device 12 to play the selection, and in particular sends a playlist id or reference identifier indicating the selection. At state 100, the content playback device 12, using its authentication credentials, sends the playlist id or reference identifier to the proxy server 22, which returns the required playlist data in state 102. The content playback device 12 can then request the content URL with the playlist data in state 104, which may be responded to with a return of the content URL for playback of the content item on the content playback device 12 in state 106.

Variations of the system and method are now described.

If the content playback device were already playing content, the new content commanded to be played by the second display may be placed in a queue in the content playback device and played when the current content completes. In any case, once the content has been commanded to be played, the user may continue to browse the second display for other content, to play or to add to the queue. Other users may employ their own second displays to do the same. A user may also desire to switch devices and resume playback on a different device by, e.g., navigating to a "recently viewed" list and selecting the last video played after switching control to the desired device.

The above description has been for the case where the proxy server 22 is employed to hide the content source, e.g., a content URL, from the second display 14*i*. That is, the proxy server 22 provides an API for the second display to use so that the content and/or content URL cannot be accessed directly, i.e., the details of the management server transactions to access the services remain desiredly unknown. In many cases, the second display 14*i* may have stored thereon little or nothing of the content playback device 12 details. In some cases, however, the URL may be directly provided from the proxy server 22 or the proxy server 22 may even be bypassed, e.g., in cases where the content item is intended for free distribution, e.g., movie trailers or the like. Similarly, while the above description has focused on content item playback on content playback device 12, certain content items, e.g., those which are intended for free distribution, may be played back on the second display 14*i* itself, if the same has been appropriately configured.

In the case where multiple second displays request content to be played at or near the same time, a simple rule such as the first-in-time may prevail. Alternatively, a priority scheme may be configured, such that certain second displays take precedence over other second displays.

Note further that the control device may command the content playback device to play content by sending to the content playback device over the local network commands coded as if they were sent from an infrared remote control, specifically for example the commands may be in the Sony Infrared Remote Control System (SIRCS) protocol.

Figure 3A:
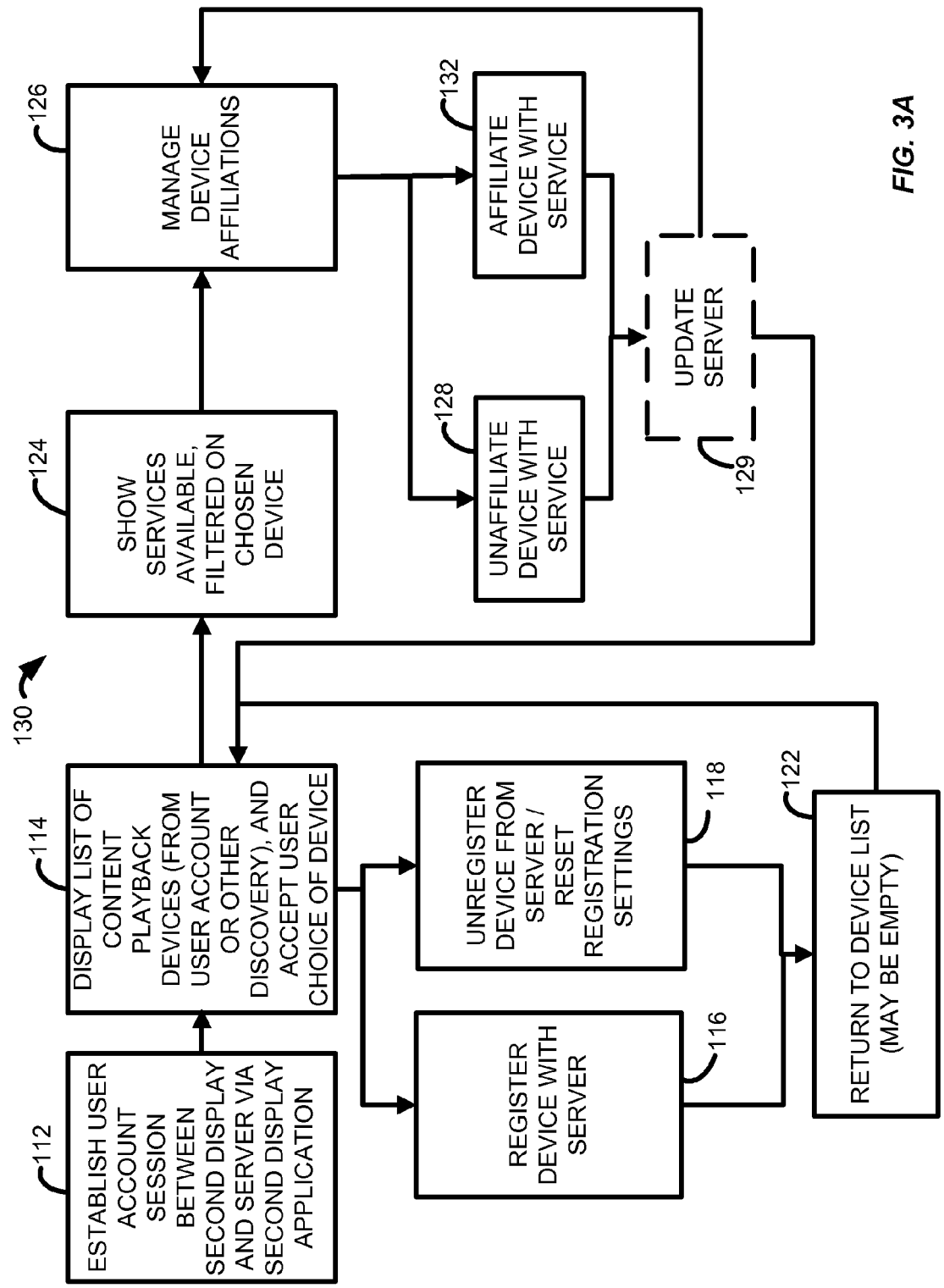
FIG. 3A is a flowchart illustrating an exemplary method according to one aspect of the present principles.

FIG. 3A illustrates one exemplary method 130 by which service affiliations may be created or destroyed. A first step is the establishment of a user account session between a second display and a server, e.g., via a second display web application (step 112). It will be understood, however, that other types of applications may also be employed. For example, the second display may employ a native application to perform these functions. The session is generally associated with a user account, and includes entering logon credentials such as a username and password. Other variations will also be understood. The server itself may be a management server, a proxy server, or the like.

A next step is to provide a means for a user to choose a content playback device (step 114). In some cases, the user account will have information stored thereon about which content playback devices are associated or registered with the user's account. Other ways of discovering content playback devices may also be employed, including discovery on the local network or via a direct wireless discovery such as via infrared or Bluetooth®. Once discovered, devices not associated with the user's account may be registered, which in the process creates an affiliation with the user's account. In any case, this step provides a means for the user to choose a content playback device to which an affiliation with a service provider will be managed.

A next step is to display the available services (step 124), as appropriate to the device chosen in step 114. In other words, various service provider options may be displayed, according to if they pertain to the chosen content playback device. For example, if the chosen content playback device is an IPTV, the displayed service providers may include affiliated providers of audiovisual content. If the content playback device is an audio receiver, the displayed service providers may include affiliated providers of audio content.

A next step is to manage device affiliations (step 126). This step may be incorporated into various steps below. In general, managing device affiliations will include inspecting affiliations, removing services, adding services, and modifying existing services.

In FIG. 3A, these are shown as unaffiliating a device with a service (step 128) and affiliating a device with a service (step 132). In the first, a device is unaffiliated with the service. Following unaffiliation, the device will generally no longer be able to access content from that service provider, except for content that is available to unaffiliated devices, if any. Unaffiliations may occur for a number of reasons, including to make slots available for other devices, particularly if the service provider only allows a limited number of devices to access content. Other reasons for unaffiliation may include that a user no longer has access to a device, such as if the device is sold, given away, stolen, in storage, broken, destroyed, or no longer connected to a network connection. In the case where ownership of a device is transferred, the user may wish to perform a "factory reset" on the device, which would remove all of the affiliations for the device, including the affiliation between that device and the user's account.

Affiliating devices with services (step 132) provides the ability to access content from the service provider. In many cases, affiliation requires some level of authentication of the content playback device. Authentication provides some measure of control over content distribution for the service provider. Step 132 may be performed in a number of ways. One way is entirely within a registration or affiliation application on the second display. Another way is for the registration or affiliation application to transfer the user to a service provider's website. At the service provider's website, the user may enter authentication information for affiliation directly. The latter method has the advantage that the user's authentication credentials for their account with the service provider are never exposed to anyone other than the service provider.

Whether a device has been affiliated with the service or unaffiliated, the server may be updated (step 129) to reflect the same. Finally, the user interface on the second display may return the user to the list of content playback devices or to another point as desired by the developer.

It is noted that, if the content playback device has not previously been associated with the user account, a step of device registration may be performed. Details of such a registration process are provided in U.S. patent application Ser. No. 12/982,463, filed Dec. 30, 2010, entitled "Device Registration Process from Second Display", owned by the assignee of the present application and incorporated by reference herein. In this figure, however, it is noted that a device can be registered with the server (step 116), or the device may be unregistered from the server (step 118). If unregistered, various registration settings on the device and within the user account may be reset. The user interface on the second display may then return the user to the device list (step 122). If no devices remain, the list may be empty.

FIG. 3B illustrates another exemplary method 120 by which service affiliations may be created or destroyed. A first step is the establishment of a user account session between a second display and a server, via a second display application (step 101). This may be accomplished in the manner noted above. A next step is to display a list of content playback devices (step 103). As above, these may be content playback devices associated with the user account or which are found by the user system via discovery. A next step is to receive a first signal on the server indicating a choice of a content playback device (step 105). In this step, a user has selected a content playback device, and a signal is transmitted from the user's second display through the local network to the server, which may be the management server, the proxy server, or the like. A next step is that the server causes to be displayed on the second display a list of service affiliations corresponding to the user account and to the chosen content playback device (step 107). From this list, the user can choose to unaffiliate the content playback device from a service, to affiliate the content playback device with a new service, or the like.

In more detail, a next step may be to receive a second signal on the server indicating a service affiliation to be removed (step 109). For example, the user interface on the second display may have a 'remove' or 'delete' button which may be employed to perform this step. Activation of such a button causes the second signal to be sent to the server. In some implementations, upon the server receiving the second signal, the server may cause a signal (termed herein a fifth signal) to be sent to a service provider to remove the affiliation (step 111). Alternatively, the un-affiliation may be performed entirely at the management server, with no reference or communication made to the content server. In another implementation, instead of the affiliation being automatically removed, the second display browser may be loaded with the URL of the service provider, and the user may enter information on a page provided by the service provider to perform the unaffiliation.

Where a new affiliation is being created, step 107 may be followed with a step of displaying potential affiliations (step 115). In this step, a number of potential affiliations may be displayed to the user, where the potential affiliations are appropriate to the chosen content playback device. For example, potential affiliations may be displayed based on other affiliations the user has set up in their account. In one example, if a user has a video service set up with certain devices, it may be presumed that the user would like the video service set up with other devices. Potential affiliations may also be based on a technical specification associated with the chosen content playback device. For example, if a chosen content playback device is an IPTV, it may be presumed that the user desires to set up audiovisual content services with that chosen content playback device.

In another implementation, the displayed potential affiliations may be based on a ruleset, where the ruleset is informed by various factors including, e.g., the region in which the content playback device is located. For example, if the content playback device is located in a foreign country, the potential services displayed may be those that are allowed in that foreign country, or those for which contracts exist between service providers and distributors in that country. In yet another implementation, potential affiliations may be based on inherited or legacy configurations known by the system about other or prior content playback devices associated with the user account.

In any case, once potential affiliations are displayed, a next step may be to receive a third signal on the server indicating a service affiliation to be added (step 117). In this step, the user indicates if a particular service affiliation is to be added, such as by activating a button or the like. In one implementation, this step is followed by a step of sending a fourth signal to the service provider to create the affiliation, including any required authentication credentials necessary to affiliate the content playback device with the service provider (step 119). As described above, the authentication credential may be needed to browse certain services. The second display may cause the authentication credential to be transmitted by sending a signal to the content playback device to cause the same to perform the transmitting, although in some cases the second display may also transmit it.

Authentication with a service is generally a two-step process. The first step is to associate the content playback device with a user account, such as with the management server or proxy server. The second step is to associate the content playback device with service providers.

The second step may be accomplished in a number of other ways as well. In one implementation, the second step is accomplished by having each service provider issue and display a code on the content playback device which the user enters into the service's web site. The service's web site then transmits a user token (which it receives from the content playback device when it created the code) and a unique affiliation token that the service provider creates to the user account, which may then store that token and associate the same with the device. The service provider may then retrieve the affiliation token back when communicating with that content playback device, so that the service provider can determine the user account to which the content playback device is affiliated. In this regard it is noted that generally affiliation tokens may be specific to a particular content playback device, and users have to enter the code into the service provider's web site for the new content playback device they are trying to affiliate. In some cases, however, a service provider may define their affiliation token as being an identifier for a user instead of a particular content playback device, in which case an affiliation token could be associated to new content playback devices as they are associated to the same user account as the device that already has that affiliation token.

In another implementation, the second display device may be employed to perform the affiliation. In this implementation, the step of displaying the code to the user on the display device may be eliminated. For example, the second display device may, if enabled, transmit an IR signal that may be received by the device to be registered, causing the device to contact the server with an identification code from the IR signal, thus registering it to the user's account that was in use on the second display. Other methods of communication may also be employed, such as Bluetooth®, to accomplish communication between the second display and the device to be registered.

A number of optional steps may also be employed. For example, information may be retrieved about the content playback device from another network source, which may be entirely unrelated. Information may be obtained about the content playback device that better allows the content playback device to be situated within the user account. For example, technical details about the content playback device may be obtained and stored.

To implement the above, in one implementation, a next step may be to receive at the server a transmitted service token and an affiliation token, and to associate the received tokens with the user account (step 121). The transmitted service token and affiliation token may be received by the management server from the content server associated with the service provider. In an alternative implementation, however, after the fourth signal is received indicating that a service affiliation is to be added, the second display browser may be loaded with the URL of the service provider, so as to allow the user to make the affiliation themselves, on the service provider website or on a form associated with the service provider but which is part of, e.g., the management server system (step 113). The use of step 113, while still requiring some user input, still provides advantages over prior systems, as the user need not find and navigate to the service provider URL, but rather has the same already loaded for them.

Aspects of various components are described below.

Figure 4:
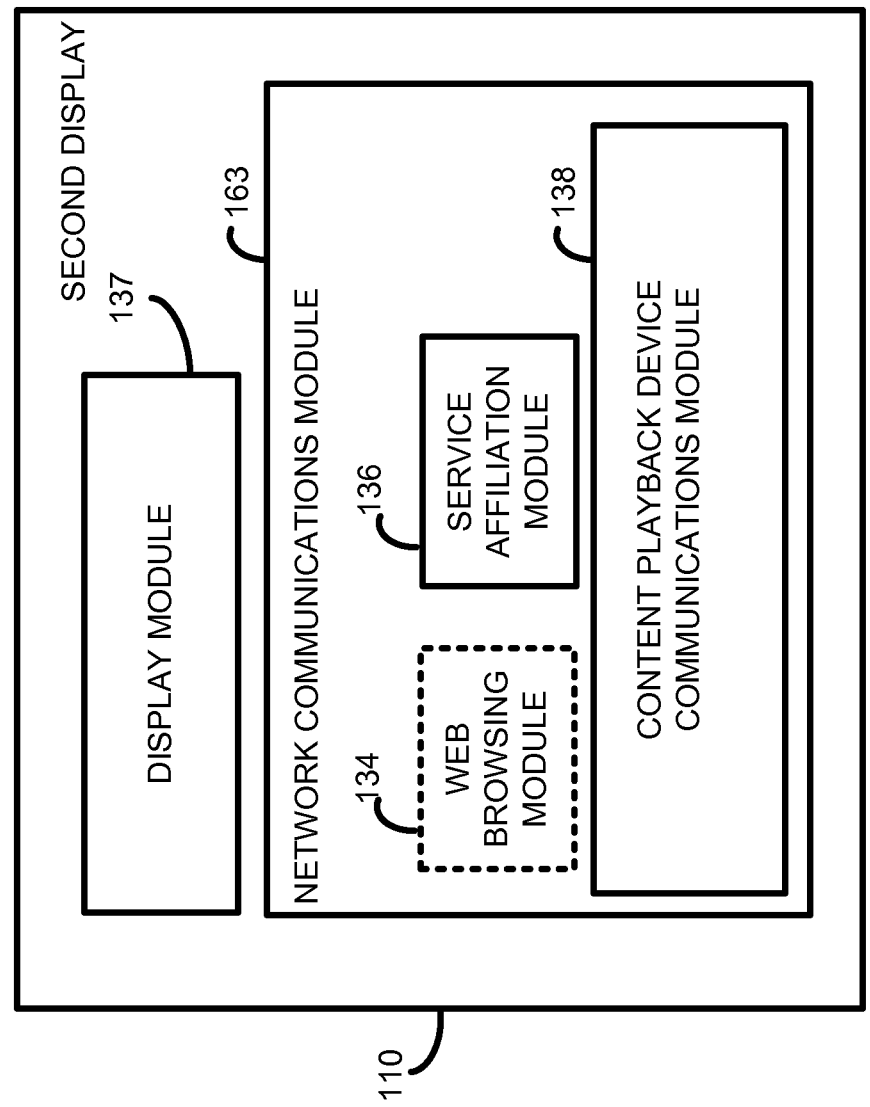
FIG. 4 is a block diagram of an exemplary second display system in accordance with another aspect of the present principles.

FIG. 4 illustrates one implementation of a second display 110. The second display 110 includes a display module 137 for use in, among other aspects, displaying and entering affiliation information. The display module 137 may also be employed in browsing lists and selecting items related to the content playback device. For example, a list of content playback devices accessible to the local network and/or addressable by the second display may be displayed using the display module 137, and the user may choose a content playback device from among them. In addition to choosing a content playback device, a user may review a list of accessible service providers using the display module 137. For example, such service providers may include those offering video-on-demand services for movies and other video content, or any number of other sites on which media and content may be browsed and selected. In one implementation, where a content playback device has been chosen, the results may be filtered based on the capability of the device to render the content. In another implementation, the display module 137 may display not just content accessible to the local network, but also content resident on the local network, such as content stored on a digital video recorder or Blu-Ray® player.

In some implementations, the display module 137 may be a module that produces an output signal for display by another device. In this case, the actual display is external to the second display itself. For example, in the case of a Blu-Ray® player being used as a second display, the display module 137 would be a unit that produces, e.g., an HDMI output signal, while the actual display is performed by the TV that is connected to that HDMI output.

The second display 110 also includes a module for network communications 163. The network communications module 163 allows the second display to communicate with the local network as well as, in some cases, specific devices directly. As part of the network communications module 163, a communications module 138 for communications with a content playback device is provided. The content playback device communications module 138 allows the second display to communicate with the content playback device either over the local network, via the internet, or directly. Such direct communications may include various types of wired or wireless transmission schemes, including Wi-Fi, USB, infrared, Bluetooth®, or the like. The content playback device communications module 138 may further include a service affiliation module 136. The service affiliation module 136 performs the affiliation steps noted above, including receiving and transmitting affiliation information, and the like.

Also within the network communications module 163 may be an optional web-browsing module 134 through which the above-noted content items may be browsed in the case where the second display application is a web application. The web-browsing module 134 may be implemented in a number of ways, and is capable of executing application code written in HTML and JavaScript, or the like. A web-browsing module implemented in such a way allows the same to be implemented across many platforms, allowing any number of types of second displays to be employed. In some cases, however, special applications, e.g., helper applications, may be employed to communicate with particular proprietary or non-web-based technologies. Where the second display application is non-web-based, and is written in, e.g., native code, the web-browsing module 134 may be replaced with a suitable other module allowing service and content selection or other such functionality.

It is noted that the above modules may be implemented in hardware, non-transitory software, or a combination of the above. Typically, the same will be implemented within the context of a laptop computer, a tablet computer, a smart phone, or the like.

Figure 5:
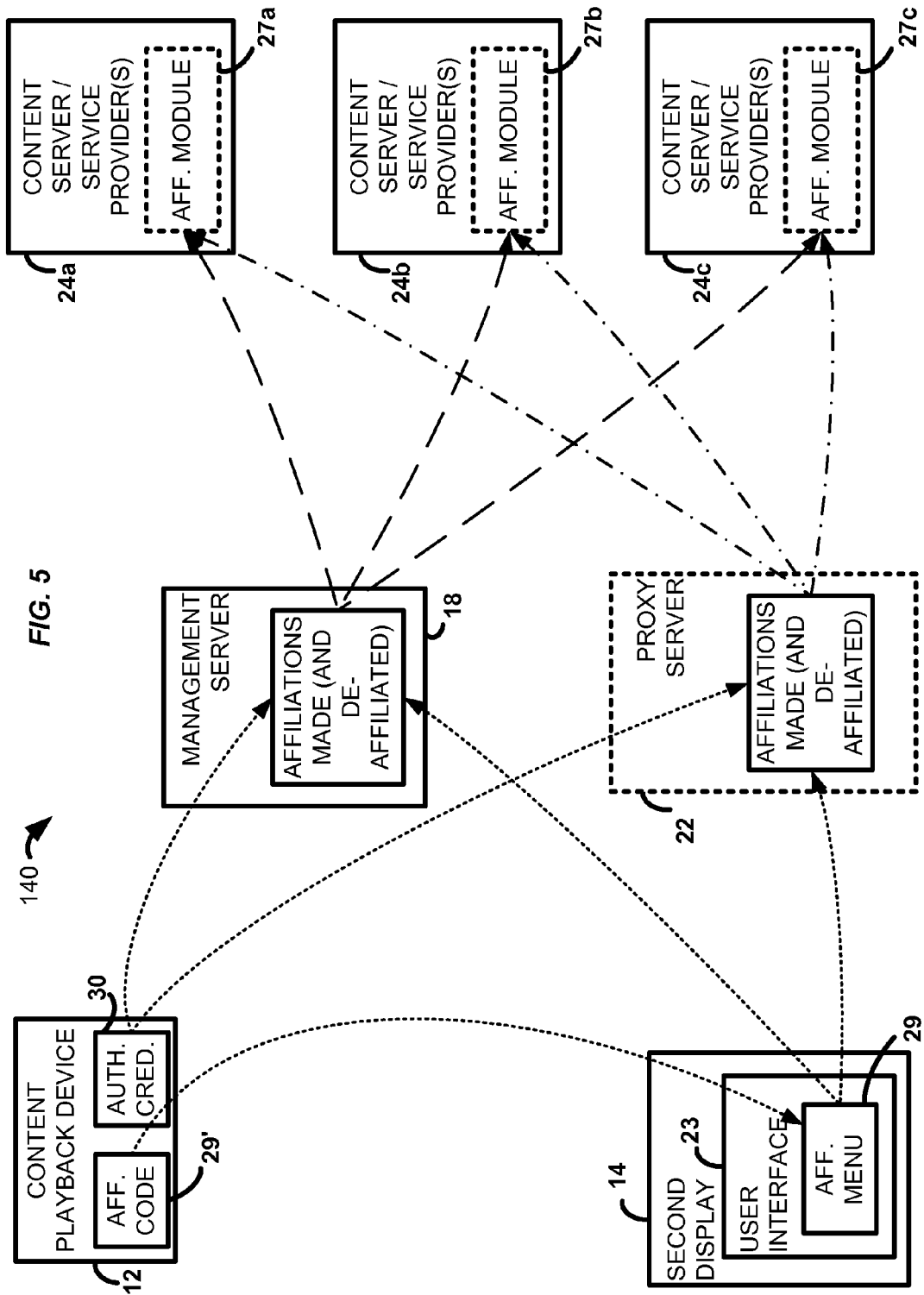
FIG. 5 is a block diagram of another exemplary system in accordance with an aspect of the present principles.

Referring to FIG. 5, a system 140 is illustrated indicating affiliation creation and destruction. Certain elements in FIG. 5 are similar to those in FIG. 1. In FIG. 5, however, a plurality of service providers 24a, 24b, and 24c are illustrated. Each has a corresponding affiliation module 27a, 27b, and 27c, respectively. FIG. 5 shows how a content playback device, as associated with the user account, can be affiliated using the authentication credentials 30 of the content playback device in either the management server 18 or a proxy server 22 to enable access to one or more service providers through their respective affiliation modules. Access to the service providers is granted because the user account, having registered therewith content playback devices having valid authentication credentials, is properly affiliated with respective service providers. As noted above, the system provides a central access point by which service providers and content playback devices may be matched and unmatched, i.e., affiliated and unaffiliated.

Figure 6:
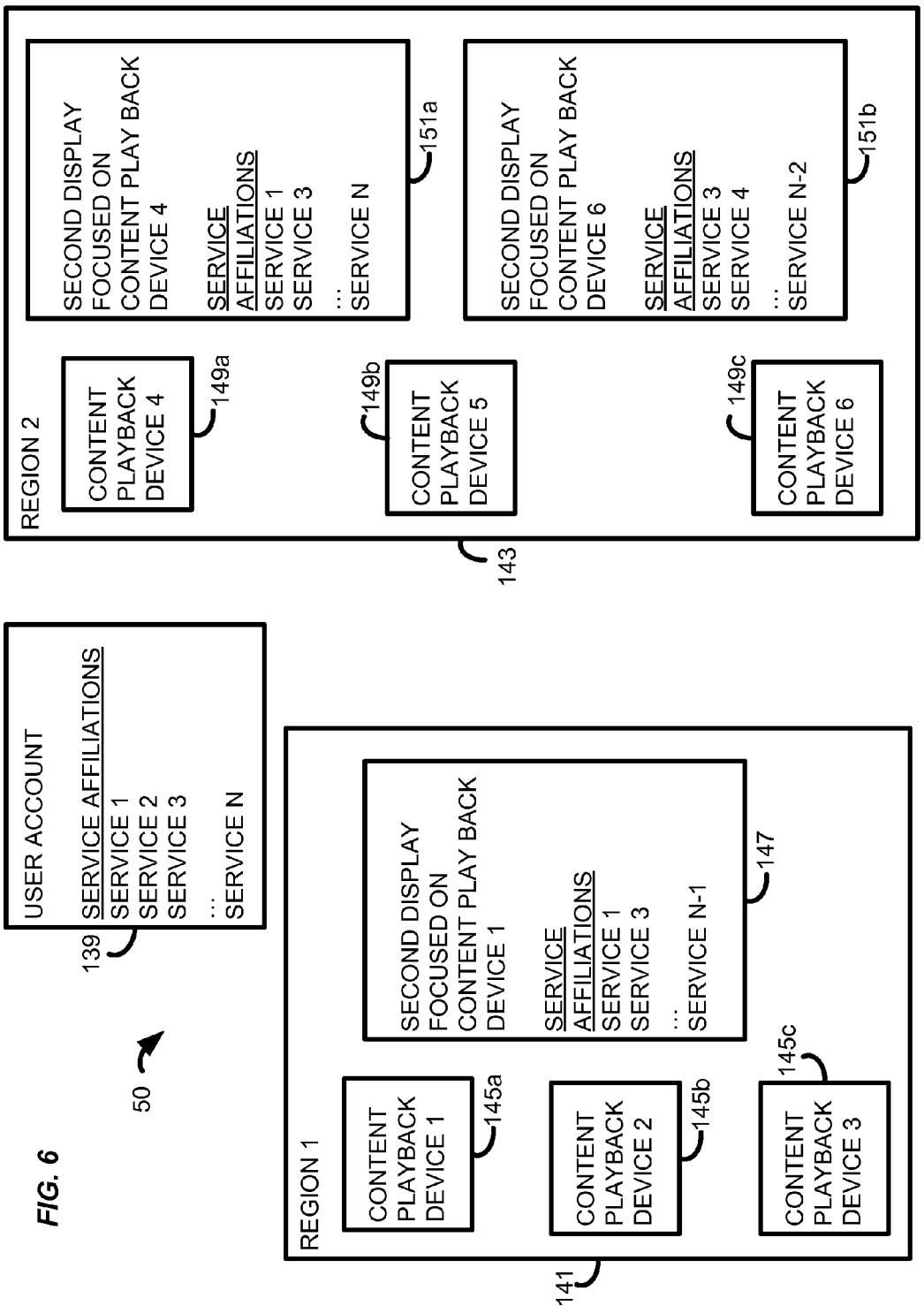
FIG. 6 is a diagram illustrating regional variations of service provider lists on various second displays in accordance with an aspect of the present principles.

FIG. 6 illustrates how rulesets based on regional variations and technical capabilities of content playback devices can lead to variations in displayed lists of services on second displays, such second displays focused on the different content playback devices.

In FIG. 6, a system 50 is illustrated showing two regions, a first region 141 and a second region 143. In this exemplary system, a user has a user account 139, and the user account has a number of service affiliations corresponding therewith, these enumerated as service affiliations 1-N. In the first region, the user has three content playback devices, a first content playback device 145a, a second content playback device 145b, and a third content playback device 145c. In the second region, the user has a fourth content playback device 149a, a fifth content playback device 149b, and a sixth content playback device 149c. Also in the first region 141, the user has a second display 147. In the second region, the user has a second display 151a and another second display 151b.

In the first region, the second display 147 is exemplified as being focused on the first content playback device 145a. The first content playback device 145a has been affiliated with a number of the services corresponding to the user account 139, but not all. In particular, the first content playback device 145a is not shown as affiliated with service 2 or with service N. Accordingly, its service affiliations are as shown in its box 147. The service affiliations for the first content playback device may be not shown with respect to those services 2 or N for a number of reasons, including content restrictions in the first region 141. Other reasons may also pertain, as have been described.

In the second region 143, the second display 151a is focused on the fourth content playback device 149a. For the same reasons as noted above, the fourth content playback device 149a may be affiliated with one or more of the service affiliations in the user account 139. The services shown in the box associated with 151a correspond to affiliated services to which the content playback device 149a may access in that region. In the same way, the second display 151b may be focused on the sixth content playback device 149c, in the sense that the user has selected that content playback device for content access from service providers. In this case, the service affiliations displayed on the second display 151b may differ from that on the second display 151a, because the two second displays are focused on different content playback devices, and the content playback devices may have different affiliations and technical specifications. In particular, the content playback device 149c is illustrated as having accessible service affiliations as listed in the user account 139, excepting service affiliations 1, 2, N−1, and N, as illustrated on the display of second display 151b. In this case, the regions are the same but the different service affiliations may pertain to differences in types of content playback devices, differences in affiliations as made by the user, or for other reasons.

Other examples may also be seen, including where a user with a second display may use the same to control a content playback device in a different region.

Figure 7:
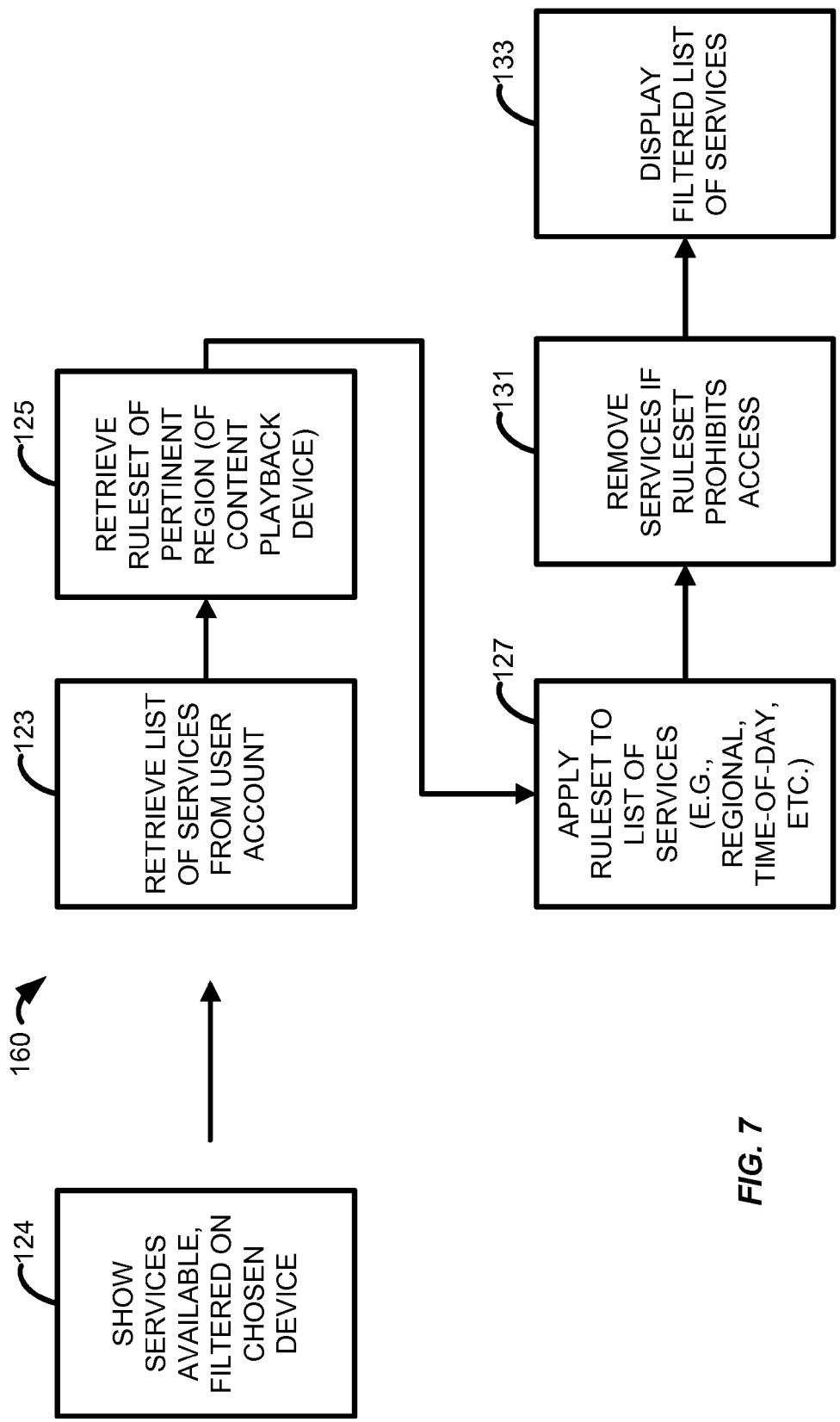
FIG. 7 is a flowchart illustrating an exemplary method according to another aspect of the present principles.

Referring to FIG. 7, an implementation of method steps is illustrated by flow chart 160. In particular, flow chart 160 illustrates method steps which may be employed in carrying out step 124, i.e., showing the available services, filtered on the chosen content playback device. A first step is to retrieve a list of services from the user account (step 123). This list of services may pertain to the list of service affiliations illustrated in block 139 of FIG. 6. A next step is to retrieve a ruleset of the pertinent region, keyed on the content playback device (step 125). In some cases, step 125 may be performed prior to step 123. A next step is to apply the retrieved ruleset to the list of services retrieved from the user account (step 127). The ruleset may contain limitations as to access according to region, time of day, or using any factor as dictated by the system. A subsequent step is to remove the services from the list to be displayed if the ruleset prohibits access to the service by the content playback device (step 131). A final step is then to display the filtered list of services (step 133). The displayed filtered list of services is displayed on the second display, e.g., by the display module 137.

As noted above, it is not required that services or service affiliations be filtered on a content playback device. Displayed services may be neutral in this regard, and a list of service affiliations may be displayed that covers all affiliations associated with the user. In some cases such a display is by user choice. In other cases service affiliations may be account-wide, and apply to all devices on the account or even to all devices accessible by the second display. Other variations will also be seen.

Figure 8:
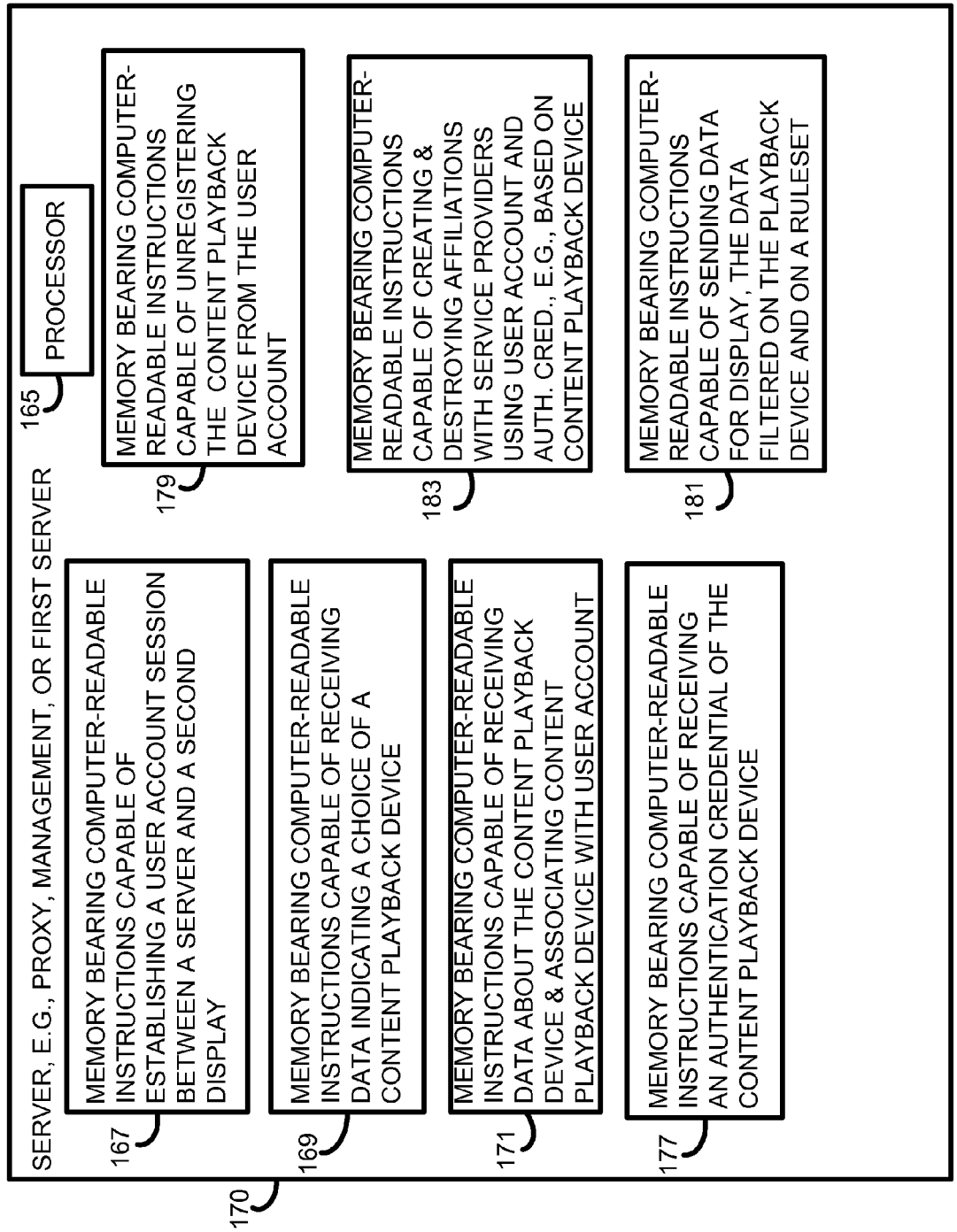
FIG. 8 is a block diagram of an exemplary server in accordance with another aspect of the present principles.

Referring to FIG. 8, an implementation of a server 170 which may operate according to the principles described here is illustrated. The server may be, e.g., a proxy server, a management server, a first server as described above, or the like. The steps performed by the memories within the server 170 are described in greater detail above. The server 170 includes a processor 165. The server 170 further includes memory 167 bearing computer-readable instructions capable of establishing a user account session between the server and a second display. The server 170 further includes memory 169 bearing computer-readable instructions capable of receiving data indicating a choice of a content playback device. The server 170 further includes memory 171 bearing computer-readable instructions capable of receiving data about the content playback device and associating the content playback device with the user account. The data about the content playback device may be received from the user, from a server, or from an unrelated or third-party Internet source. The server 170 further includes memory 177 bearing computer-readable instructions capable of receiving an authentication credential of the content playback device. The server 170 further includes memory 179 bearing computer-readable instructions capable of unregistering the content playback device from the user account. The server 170 further includes memory 183 bearing computer-readable instructions capable of creating and destroying affiliations with service providers using information in the user account and if necessary the authentication credential of the content playback device. The server 170 further includes memory 181 bearing computer-readable instructions capable of sending data for display, the data filtered on the content playback device and on a ruleset. The ruleset, as described above, may be based on a number of factors, including local regulations, contractual rules, or the like.

In an alternative implementation, these memories as described above may be implemented as modules, either in software, hardware, or various forms of firmware. For example, a session module may be employed to establish user account sessions between the server and the second display. Various communications modules may be employed to, e.g., receive data indicating a choice of a content playback device, receive data indicating a service provider to be affiliated with the content playback device, and transmit data to a service provider to affiliate the content playback device with the same.

It is also noted that second displays may be implemented in terms of such memories, although in this case the memories may include: a memory bearing computer readable instructions capable of establishing a user account session between the second display and a server; memory bearing computer readable instructions capable of receiving user input indicating a choice of a content playback device (such as via the user interface); memory bearing computer readable instructions capable of receiving user input about a service provider such as to create or destroy an affiliation between the selected content playback device and the service provider; and memory bearing computer readable instructions capable of displaying data for display, such as to provide the functionality described above (selecting content playback devices and service providers), as well as to display a list of service providers from which content items may be played back, as filtered by a ruleset.

Systems and methods have been disclosed that allow improvement of the user experience of the IPTV without adding to the hardware costs of the unit. As disclosed above, users may use the system and method to register and manage affiliations for IPTVs directly from a second display. The user need not visit multiple service provider websites to affiliate their devices with each service provider. Instead, upon the establishment of a user account session, the user may be enabled to directly control affiliations between their service providers and their content playback devices. In particular, the management server and/or proxy server may employ APIs that allow access and modification of service provider accounts. Modifying these accounts using a user interface on the second display causes the modification to propagate through to the service providers, negating the need for a user to individually access and modify each service provider account. In addition, besides affiliating new content playback devices, the system may be employed to affiliate or remove content playback devices from service provider accounts.

Figure 9:
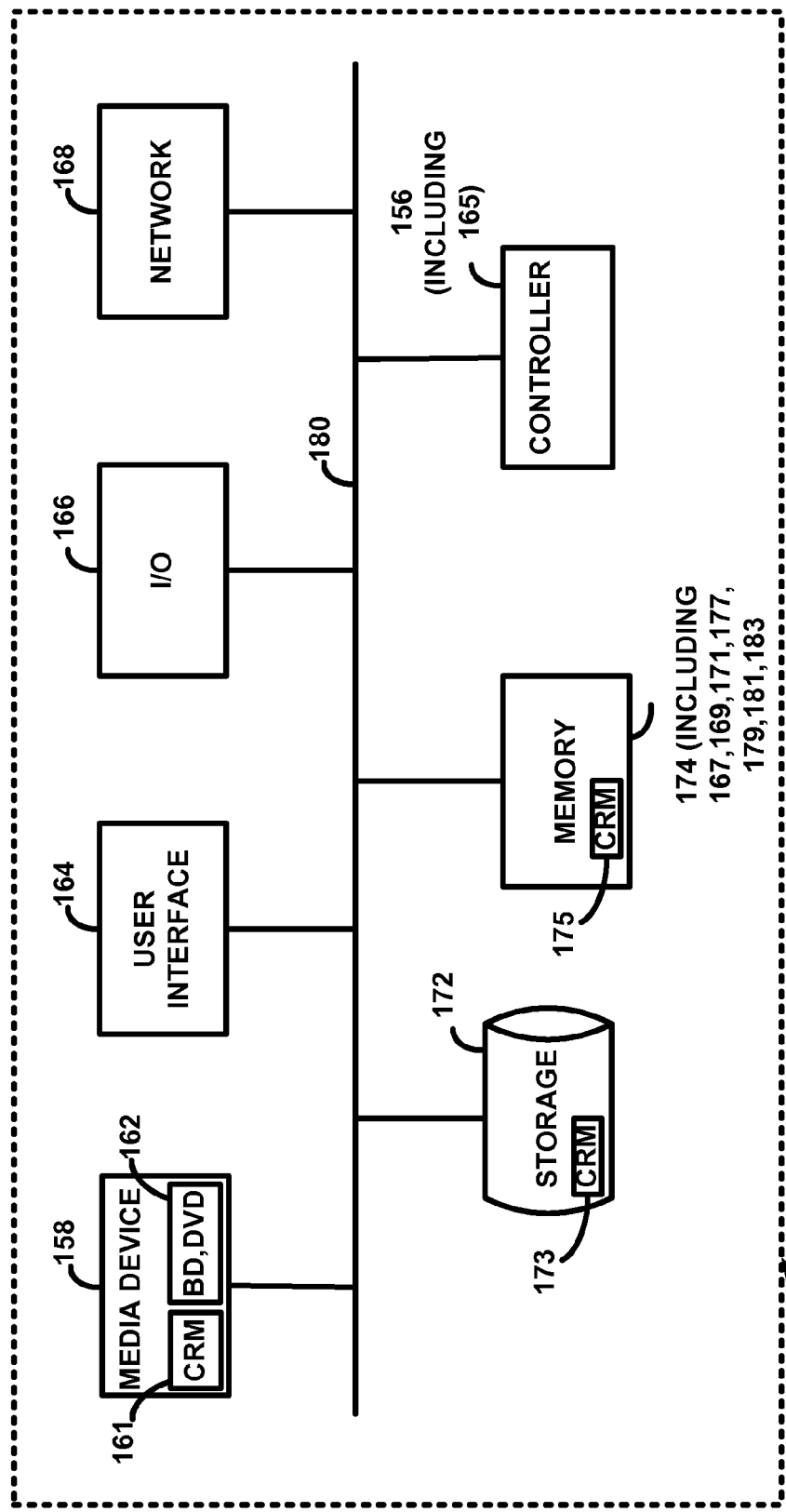
FIG. 9 illustrates an exemplary computing environment, e.g., that of the disclosed second display, proxy server, or management server.

One implementation includes one or more programmable processors and corresponding computing system components to store and execute computer instructions, such as to execute the code that provides the second display or various server functionality, e.g., that of the proxy server 22, management server 18, and content server 24, as well as for browsing. Referring to FIG. 9, a representation of an exemplary computing environment for a second display or for any of the servers is illustrated.

The computing environment includes a controller 156, a memory 174, storage 172, a media device 158, a user interface 164, an input/output (I/O) interface 166, and a network interface 168. The components are interconnected by a common bus 170. Alternatively, different connection configurations can be used, such as a star pattern with the controller at the center.

The controller 156 includes a programmable processor and controls the operation of the second display and servers and their components. The controller 156 loads instructions from the memory 174 or an embedded controller memory (not shown) and executes these instructions to control the system. In its execution, the controller 156 may provide the second display control of a content playback device system as, in part, a software system. Alternatively, this service can be implemented as separate modular components in the controller 156 or the second display.

Memory 174, which may include non-transitory computer-readable memory 175, stores data temporarily for use by the other components of the second display 14*i*, and the same may include memories 167, 169, 171, 177, 179, 181, and 183 as discussed above. In one implementation, memory 174 is implemented as RAM. In other implementations, memory 174 also includes long-term or permanent memory, such as flash memory and/or ROM.

Storage 172, which may include non-transitory computer-readable memory 173, stores data temporarily or long-term for use by other components of the second display and servers, such as for storing data used by the system. In one implementation, storage 172 is a hard disc drive or a solid state drive.

The media device 158, which may include non-transitory computer-readable memory 161, receives removable media and reads and/or writes data to the inserted media. In one implementation, the media device 158 is an optical disc drive or disc burner, e.g., a writable Blu-Ray® disc drive 162.

The user interface 164 includes components for accepting user input, e.g., the service affiliation information, from the user of the second display, and presenting information to the user. In one implementation, the user interface 164 includes a keyboard, a mouse, audio speakers, and a display. The controller 156 uses input from the user to adjust the operation of the second display 14*i*.

The I/O interface 166 includes one or more I/O ports to connect to corresponding I/O devices, such as external storage or supplemental devices, e.g., a printer or a PDA. In one implementation, the ports of the I/O interface 166 include ports such as: USB ports, PCMCIA ports, serial ports, and/or parallel ports. In another implementation, the I/O interface 166 includes a wireless interface for wireless communication with external devices. These I/O interfaces may be employed to connect to one or more content playback devices.

The network interface 168 allows connections with the local network and optionally with content playback device 12 and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The second display and servers may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention. For example, the application running on the second display may be a web application, a native application, a Java application, or any other sort of application that may work to establish a session with a server. Moreover, while several implementations of the invention include that the user select a particular content playback device for playback, in some implementations a user may browse content with no content playback device selected at all. The user may also browse transactions like video rentals or home shopping purchases on the second display. The user may also request content items to be played back that are resident within the local network, e.g., content stored on a DVR or Blu-Ray® player. In addition, the second display could also include and update information about other related devices, such as a media player and a game console. While a full affiliation website may be primarily mainly developed for the PC, a subset of its more frequently-used functions may be implemented on the second display as the affiliation menu 29.

While the system and method have described implementations in which content playback devices have been selected before browsing and where little or no reference to content playback devices is made, other variations are possible. For example, a cache or cookie or other information may be employed to store information about content playback devices, so that no user choice is necessary. In another example, samples of content items may be obtained from content service providers, and these samples may be browsed freely without a user selection of a content playback device for playback. In another variation, a profile system may be employed that communicates content playback device information upon start-up according to a profile; e.g., a given content playback device may always be associated with and may authenticate itself with a given service provider. In this sense, a content playback device is still being chosen, but the choice does not require an affirmative step by the user. Use of any of these alternatives, or others, ensures that the content consumption of each content playback device is tracked. It further allows, as described, the proxy server to filter out content that the content playback device is incapable of playing. It is also noted that certain types of browsing may require no device choice at all, e.g., browsing shopping sites. Still, some level of customization may occur, e.g., by consideration of the origination location of the visiting second display's IP address.

In addition, the above description was primarily directed to an implementation in which the local IP address of the second display was retrieved and stored on the server. However, other ways of discovering the second display are also possible. For example, device discovery is also possible using a broadcast method within the local network. Compatible devices that recognize the broadcast message will respond with their necessary credentials and information to indicate their compliance with the web application for the second display. In many cases, broadcasting methods are primarily directed to native applications, not web applications; however, a broadcasting library may be employed to allow the implementation within a web application.

While the above description has focused on implementations where a second display is coupled to a content playback device through a local network or over the internet, it will be understood that the same will apply to any method by which the two may communicate, including 3G, 4G, and other such schemes.

Accordingly, the present invention is not limited to only those implementations described above.

The invention claimed is:

1. A method of managing service affiliations of one or more content playback devices using a second display, comprising:
   i. establishing a session between a second display and a server;
   ii. causing a list of one or more content playback devices to be displayed on the second display;
   iii. receiving a first signal on the server indicating a user choice of a content playback device; and
      1. causing a list of service affiliations to be displayed on the second display corresponding to service providers, the service affiliations associated and authenticated with the content playback device, the service affiliations allowing the provision of multiple items of content to the content playback device, and receiving a second signal on the server indicating that a service affiliation associated with the content playback device is to be removed, and removing the service affiliation; or 2. receiving a third signal on the server indicating that a service affiliation is to be added and associated with the content playback device, and sending a fourth signal to a service provider associated with the service affiliation to create the service affiliation.

2. The method of claim 1, wherein the session is associated with a user account, wherein at least one of the content playback devices displayed are associated with the user account, and wherein at least one of the service affiliations displayed are associated with the user account.

3. The method of claim 1, further comprising displaying a list of potential service affiliations, and wherein the receiving a third signal on the server further comprises receiving a selection from the list of potential service affiliations.

4. The method of claim 3, further comprising generating the list of potential service affiliations based on at least one other service affiliation associated with the user account.

5. The method of claim 3, further comprising generating the list of potential service affiliations based on at least one technical specification associated with the chosen content playback device.

6. The method of claim 3, further comprising generating the list of potential service affiliations based on at least one ruleset.

7. The method of claim 6, wherein the ruleset is based on a geographic region of the chosen content playback device.

8. The method of claim 1, further comprising loading a browser of the second display with a URL associated with the chosen service provider.

9. The method of claim 1, further comprising receiving information about the content playback device from a second server.

10. The method of claim 1, wherein the content playback device is an IPTV, a digital video recorder, a Blu-Ray® player, a Blu-Ray® recorder, a DVD player, a DVD recorder, an internet appliance, or an audio system.

11. The method of claim 1, further comprising inheriting a configuration from another content playback device, the configuration including at least one set of one or more service affiliations.

12. The method of claim 1, wherein the second display is a tablet computer, a smart phone, a laptop computer, a desktop computer, an internet appliance, or a computing device with internet access.

13. The method of claim 2, wherein upon receipt of the third signal, further comprising receiving an inputted code and transmitting the received code to the service provider, and receiving from a service provider a transmitted user token and affiliation token, the tokens to be associated with the user account.

14. The method of claim 2, wherein upon receipt of the second signal, at least one user account identifier and the authentication credential is transmitted to the service provider, whereby the service affiliation is removed from the content playback device.

15. The method of claim 1, wherein the causing a list of one or more content playback devices to be displayed on the second display includes: retrieving information about content playback devices from a user account, discovering content playback devices on a local network, discovering content playback devices from a wireless broadcast communication, or discovering content playback devices from an infrared remote control signal.

16. The method of claim 1, wherein the removing the service affiliation further comprises sending a fifth signal to a service provider associated with the service affiliation to remove the service affiliation.

17. The method of claim 1, wherein the fourth signal includes at least one authentication credential associated with the content playback device.

18. A non-transitory computer-readable medium, comprising instructions for causing a computing device to implement the method of claim 1.

19. A method of displaying service affiliations of one or more content playback devices using a second display, comprising:
i. establishing a session between a second display and a server;
ii. causing a list of one or more content playback devices to be displayed on the second display;
iii. receiving a first signal on the server indicating a user choice of a content playback device; and
iv. generating a list of service affiliations to be displayed on the second display corresponding to service providers, the service affiliations associated with the content playback device;
v. receiving a selection of a service affiliation corresponding to a service provider from the list, from the second display;
vi. based on the selection from the second display, arranging access of the second display to the selected service provider based on an authentication credential of the content playback device.

20. The method of claim 19, further comprising:
i. filtering the list based on a ruleset; and
ii. causing the filtered list to be displayed on the second display.

21. The method of claim 20, wherein the ruleset is based on a geographic location of the chosen content playback device.

22. The method of claim 20, wherein the ruleset is based on a time of day of the chosen content playback device.

23. A non-transitory computer-readable medium, comprising instructions for causing a computing device to implement the method of claim 19.

24. A method of displaying service affiliations of one or more content playback devices using a second display, comprising:
i. establishing a session between a second display and a server, the session associated with a user account;
ii. causing a list of one or more content playback devices to be displayed on the second display;
iii. receiving a first signal indicating a selection of a content playback device from the list; and
iv. generating and causing to be displayed a list of service affiliations on the second display corresponding to service providers, the service affiliations associated with the user account wherein the generating is based on service affiliations associated and authenticated with the selected content playback device, the service affiliations allowing the provision of multiple items of content to the content playback device.

25. A non-transitory computer-readable medium, comprising instructions for causing a computing device to implement the method of claim 24.

26. A method of managing service affiliations of a user account using a second display, comprising:
i. establishing a session between a second display and a server, the session associated with a user account;
ii. causing a list of one or more content playback devices to be displayed on the second display;

iii. receiving a first signal on the server indicating a user choice of a content playback device;
iv. causing a list of service affiliations to be displayed on the second display corresponding to service providers, the service affiliations associated with the user account; and
  1. receiving a second signal on the server from the second display indicating that a service affiliation associated with the user account is to be removed, and based on the second signal from the second display removing the service affiliation including arranging access of the second display to the service provider based on an authentication credential of the chosen content playback device; or
  2. receiving a third signal on the server from the second display indicating that a service affiliation is to be added and associated with the user account, and sending a fourth signal to a service provider associated with the service affiliation to create the service affiliation, including arranging access of the second display to the service provider based on an authentication credential of the chosen content playback device.

27. A non-transitory computer-readable medium, comprising instructions for causing a computing device to implement the method of claim 26.

28. A method of managing service affiliations of one or more content playback devices using a second display, comprising:
  i. establishing a session between a second display and a server;
  ii. displaying a list of one or more content playback devices on the second display;
  iii. transmitting a first signal to the server indicating a user choice of a content playback device;
  iv. displaying a list of service affiliations corresponding to service providers, the service affiliations associated with the content playback device; and
    1. transmitting a second signal to the server indicating that a service affiliation associated with the content playback device is to be removed, including arranging access of the second display to the service provider based on an authentication credential of the chosen content playback device; or
    2. transmitting a third signal to the server indicating that a service affiliation is to be added and associated with the content playback device, whereby a fourth signal is sent to a service provider associated with the service affiliation to create the service affiliation, including arranging access of the second display to the service provider based on an authentication credential of the chosen content playback device.

29. The method of claim 28, wherein the session is associated with a user account, wherein the content playback devices are associated with the user account, wherein the service affiliations are associated with the user account.

30. The method of claim 28, further comprising transmitting a fifth signal to a service provider associated with the service affiliation to remove the service affiliation.

31. The method of claim 28, wherein the fourth signal includes at least one authentication credential associated with the content playback device.

32. A non-transitory computer-readable medium, comprising instructions for causing a computing device to implement the method of claim 28.

33. A method of managing service affiliations of one or more content playback devices using a second display, comprising:
  i. establishing a session between a second display and a server, the session associated with a user account;
  ii. displaying a list of one or more content playback devices on the second display;
  iii. transmitting a first signal to the server indicating a user choice of a content playback device;
  iv. displaying a list of service affiliations corresponding to service providers, the service affiliations associated with the user account, the service affiliations authenticated with the chosen content playback device and allowing the provision of multiple items of content to the chosen content playback device; and
    1. transmitting a second signal to the server indicating that a service affiliation associated with the user account is to be removed; or
    2. transmitting a third signal to the server indicating that a service affiliation is to be added and associated with the user account, whereby a fourth signal is sent to a service provider associated with the service affiliation to create the service affiliation.

34. A non-transitory computer-readable medium, comprising instructions for causing a computing device to implement the method of claim 33.

\* \* \* \* \*